(12) United States Patent
Koshiyama et al.

(10) Patent No.: US 8,297,711 B2
(45) Date of Patent: Oct. 30, 2012

(54) CIRCULAR BICYCLE RIM

(75) Inventors: Kazuki Koshiyama, Osaka (JP);
Hisashi Matsui, Osaka (JP)

(73) Assignee: Shimano Inc., Osaka (JP)

( * ) Notice: Subject to any disclaimer, the term of this patent is extended or adjusted under 35 U.S.C. 154(b) by 242 days.

(21) Appl. No.: 12/757,718

(22) Filed: Apr. 9, 2010

(65) Prior Publication Data

US 2011/0248552 A1    Oct. 13, 2011

(51) Int. Cl.
*B60B 21/10* (2006.01)
(52) U.S. Cl. ........... 301/95.104; 301/55; 301/95.101
(58) Field of Classification Search ........... 301/55, 301/58, 95.101, 95.104
See application file for complete search history.

(56) References Cited

U.S. PATENT DOCUMENTS

| | | | | |
|---|---|---|---|---|
| 3,732,951 A | * | 5/1973 | Hata et al. | 188/24.13 |
| 4,015,652 A | * | 4/1977 | Harris | 152/379.3 |
| 4,151,870 A | * | 5/1979 | Watts | 152/375 |
| 4,284,302 A | * | 8/1981 | Drews | 296/181.5 |
| 4,561,481 A | * | 12/1985 | Kawauchi et al. | 152/379.3 |
| 5,378,524 A | * | 1/1995 | Blood | 428/141 |
| 5,848,769 A | * | 12/1998 | Fronek et al. | 244/200 |
| 6,497,042 B1 | * | 12/2002 | Dietrich | 29/894.333 |
| 6,588,853 B2 | | 7/2003 | Okajima | |
| 7,114,785 B2 | | 10/2006 | Ording et al. | |
| 7,413,262 B2 | * | 8/2008 | Ording et al. | 301/110.5 |
| 2009/0058180 A1 | * | 3/2009 | Poertner et al. | 301/95.103 |
| 2009/0236902 A1 | * | 9/2009 | Zibkoff | 301/104 |

FOREIGN PATENT DOCUMENTS

| | | |
|---|---|---|
| EP | 1 795 370 A1 | 6/2007 |
| WO | WO 2007/146014 A2 | 12/2007 |

OTHER PUBLICATIONS

European Search Report of corresponding EP Application No. 11 15 8850.5 darted Aug. 11, 2011.

* cited by examiner

*Primary Examiner* — Kip T Kotter
(74) *Attorney, Agent, or Firm* — Global IP Counselors, LLP (57) ABSTRACT

A circular bicycle rim is provided with a rim body, an annular tire engagement portion and first and second outer peripheral edges. The rim body includes a first annular side wall portion and a second annular side wall portion. The annular tire engagement portion extends between the first and second annular side wall portions to engage a tire thereon. The first and second outer peripheral edges are located between the rim body and the annular tire engagement portion. Each of the first and second outer peripheral edges has an uneven edge surface that repeatedly rises and falls with respect to a radial direction of the bicycle rim.

20 Claims, 9 Drawing Sheets

CIRCULAR BICYCLE RIM

BACKGROUND

1. Field of the Invention

This invention generally relates to a bicycle rim. More specifically, the present invention relates to a bicycle rim that is configured to reduce aerodynamic drag as the bicycle rim rotates about a center rotational axis and moves forward.

2. Background Information

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

Generally speaking, there are two main types of bicycle rims. The first main type of a bicycle rim is called a clincher type rim in that the rim has flanges that define annular grooves such that a wire or aramid (Kevlar) fiber bead of a tire interlocks with flanges in the rim. The above types of wheels have been, designed for use with tube tires or tubeless tires. Typically, tubeless tire wheels have an annular seal arranged to seal the spoke attachment openings of the rim. The second main type of a bicycle rim is called a tubular or sew-up rim. In tubular or sew-up rims, a tubular tire with a torus shaped is attached to the rim with adhesive. The tire engagement area of the rim is often provided with a shallow concave cross section in which the tire lies instead of flanges on which tire beads seat.

In recent years, bicycle rims have been made to be more aerodynamic. Aerodynamic bicycle rims often have a small axial dimension and a large radial dimension with respect to the center rotational axis. One example of an aero-wheel is disclosed in U.S. Pat. No. 7,114,785. In this patent, the first and second sides of wheel have a plurality of dimples. These dimples are designed to reduce aerodynamic drag.

SUMMARY

One aspect is to provide a circular bicycle rim that reduces aerodynamic drag as the bicycle rim rotates about a center rotational axis and moves forward.

In view of the state of the known technology, a bicycle rim is provided that mainly comprises a rim body, an annular tire engagement portion and first and second outer peripheral edges. The rim body includes a first annular side wall portion and a second annular side wall portion. The annular tire engagement portion extends between the first and second annular side wall portions to engage a tire thereon. The first and second outer peripheral edges are located between the rim body and the annular tire engagement portion. Each of the first and second outer peripheral edges has an uneven edge surface that repeatedly rises and falls with respect to a radial direction of the bicycle rim.

These and other objects, features, aspects and advantages will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
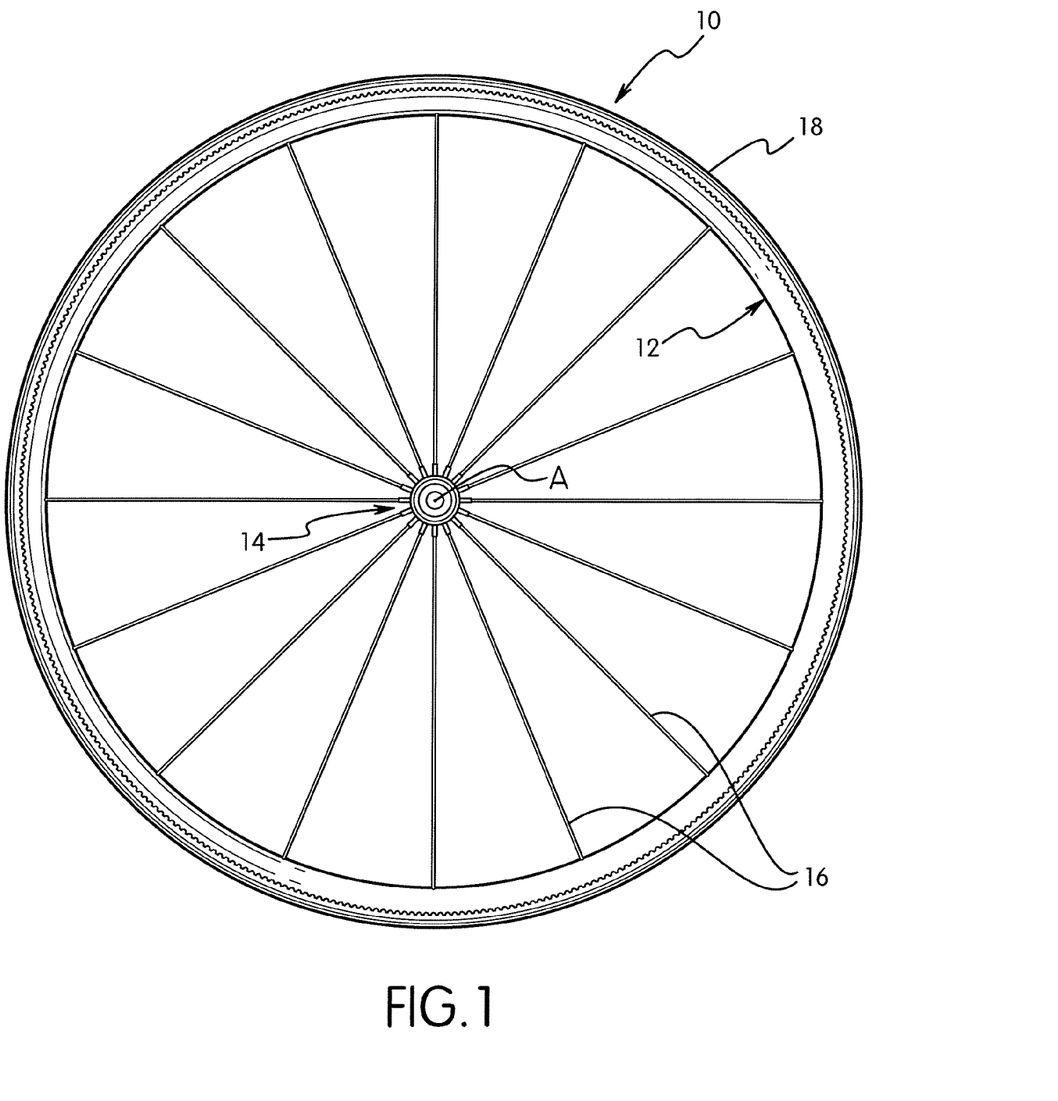
FIG. 1 is a side elevational view of a bicycle wheel that is equipped with a circular bicycle rim in accordance with a first embodiment.

Referring initially to FIG. 1, a bicycle wheel 10 is illustrated in accordance with a first embodiment. The bicycle wheel 10 basically includes a circular bicycle rim 12, a center hub 14 and a plurality of spokes 16. The spokes 16 interconnect the rim 12 and the center hub 14 together in a conventional manner. A pneumatic tire 18 is secured to the outer surface of the rim 12. In this embodiment, the tire 18 is illustrated as a sew-up or tubular tire. However, as explained below, the rim 12 can be configured for other types of tires as needed and/or desired. The precise construction of the center hub 14 is not important, and thus, the center hub 14 will not be discussed and/or illustrated in detail herein. The center hub 14 can be any type of bicycle hub. Likewise, the precise construction of the spokes 16 is not important, and thus, the spokes 16 will not be discussed and/or illustrated in detail herein. The spokes 16 can be any type of spokes or other type of connecting device (e.g., disc-shaped connecting member).

In the illustrated embodiment, the spokes 16 are radial tension spokes that connect the hub 14 to the rim 12. For example, eight of the spokes 16 extend to one side of the hub 14, while the other eight spokes 16 extend to the other side of the hub 14, as explained below. In the illustrated embodiment, the hub 14 is a front hub (i.e. the hub 14 does not include one or more sprockets) that utilizes sixteen radial spokes 16 coupled to the rim 12 at equally spaced circumferential locations as seen in FIG. 1. Of course, it will be apparent to those skilled in the art from this disclosure that the rim 12 could use be modified to accommodate different spoking arrangements (e.g. all tangential spokes, some tangential spokes and some radial spokes, etc.) without departing from the scope of the present invention. Also, it will also be apparent to those skilled in the art from this disclosure that the rim 12 could use be modified to accommodate fewer or more sixteen spokes if needed and/or desired. In any case, the spokes 16 are preferably coupled to the annular rim 12 in a circumferentially spaced arrangement.

Figure 2:
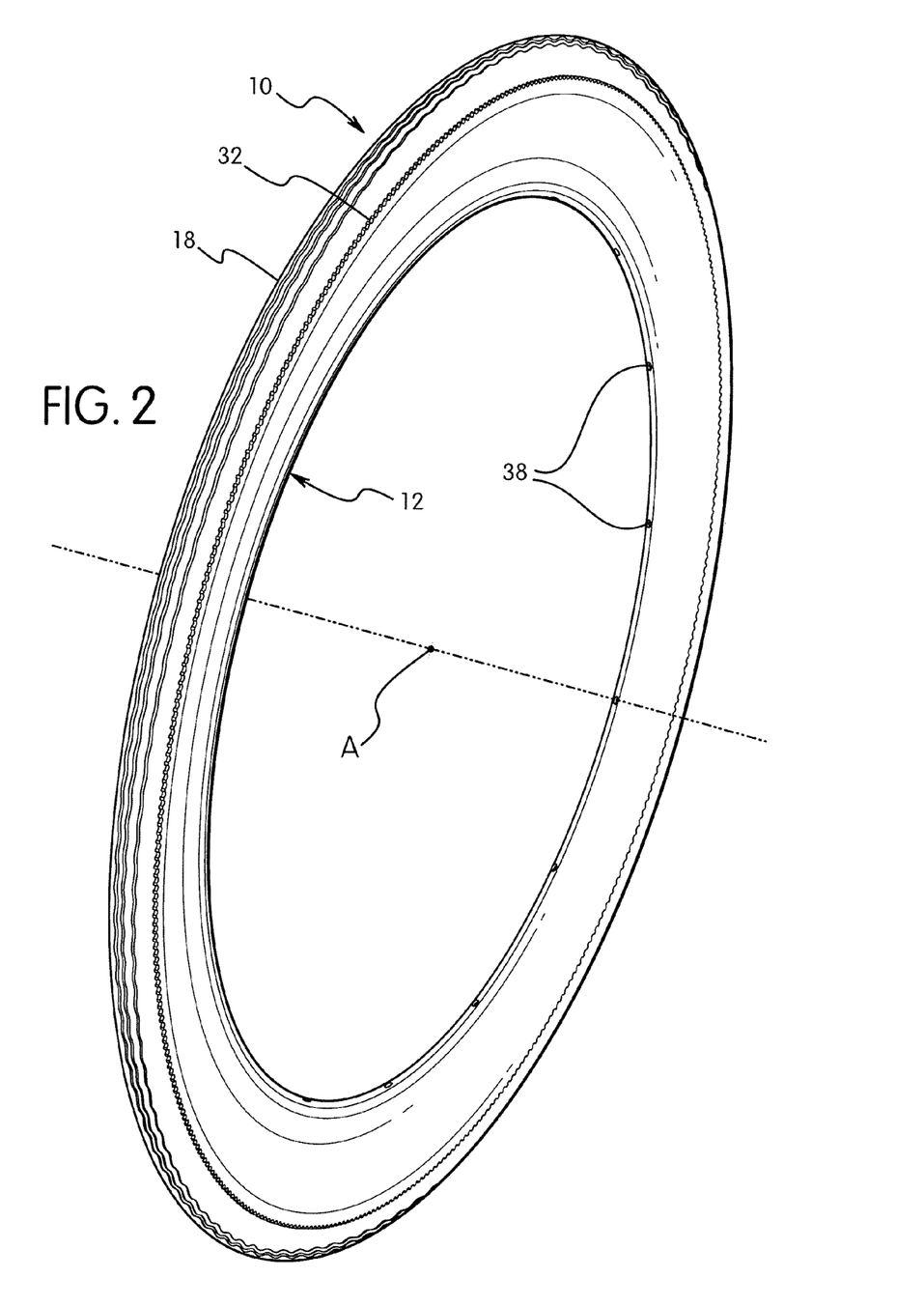
FIG. 2 is a perspective view of the circular bicycle rim illustrated in FIG. 1, with the tire installed thereon.

As seen in FIGS. 1 and 2, the rim 12 is an annular member that is designed for rotation about a center rotational axis A. The rim 12 is typically a metal extrusion that is butted into its self to form a hoop. However, the rim 12 can be constructed of a wide variety of substantially rigid material, such as those materials that are well known in the art. For example, the rim 12 can be constructed of any suitable metallic material, such as plated steel, stainless steel, aluminum, magnesium or titanium, as well as other non-metallic materials, such as a carbon fiber composite. Preferably, the rim 12 is constructed of an aluminum alloy. However, the rim 12 can also be a composite structure in which an aerodynamic carbon hoop bonded to an aluminum rim.

The construction of the rim 12 will now be discussed in more detail. Referring to FIGS. 1-4, the rim 12 is substantially circular as seen in side elevation (FIG. 1). The rim 12 basically includes a first annular side wall portion 22 and a second annular side wall portion 24. The first and second annular side wall portions 22 and 24 are connected at their inner ends to form an inner annular portion 26. The outer ends of the first and second annular side wall portions 22 and 24 are connected together by an annular tire engagement portion 28. The annular tire engagement portion 28 is configured and arranged between the first and second annular side wall portions 22 and 24 to engage the tire 18 thereon.

Figure 3:
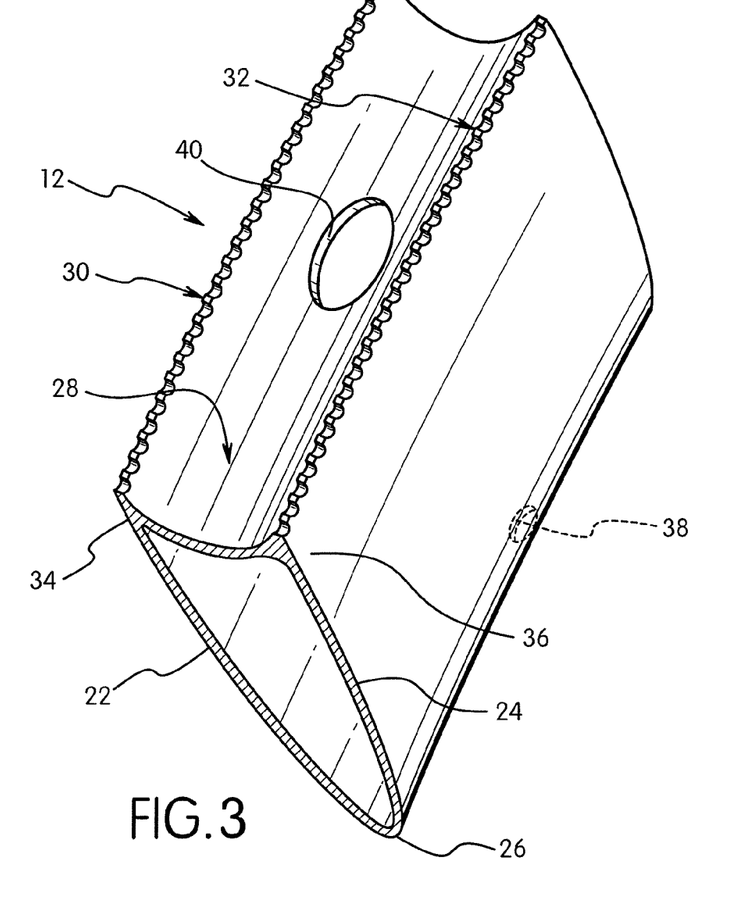
FIG. 3 is an enlarged, partial perspective view of the circular bicycle rim illustrated FIGS. 1 and 2.

As seen in FIG. 3, the first and second annular side wall portions 22 and 24 define a one-piece, unitary rim body of the rim 12. In the illustrated embodiment, the first and second annular side wall portions 22 and 24 and the annular tire engagement portion 28 are formed as one-piece, unitary member. Also in the illustrated embodiment, the first and second annular side wall portions 22 and 24 and the annular tire engagement portion 28 form an annular hollow area.

Figure 4:
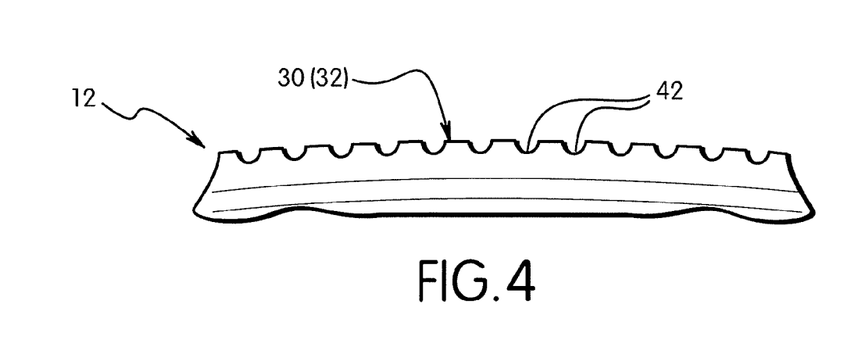
FIG. 4 is a further enlarged, partial side elevational view of one of the outer peripheral edges of the circular bicycle rim illustrated FIGS. 1 to 3.

As best seen in FIG. 3, first and second outer peripheral edges 30 and 32 are formed by the intersection of the annular tire engagement portion 28 with the first and second annular side wall portions 22 and 24, respectively. In other words, the first and second outer peripheral edges 30 and 32 are located between the rim body and the annular tire engagement portion 28, and the first and second outer peripheral edges 30 and 32 are located radially outward of the rim body as seen in FIGS. 3 and 4. In this embodiment, the first and second annular side wall portions 22 and 24 are provided with first and second brake engagement surfaces 34 and 36, respectively, that are adjacent the first and second outer peripheral edges 30 and 32. In this embodiment, the annular tire engagement portion 28 has a sew-up or tubular tire engagement surface. Thus, the term "tubular tire engagement surface" as used herein refers to a non-clincher type tire engagement surface that is configured to receive a sew-up or tubular tire.

Figure 5:
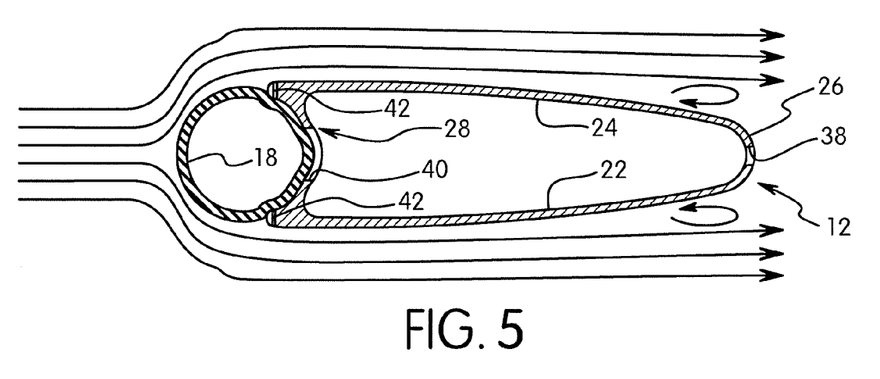
FIG. 5 is a cross-sectional view of the circular bicycle rim and tire illustrated in FIGS. 1 to 4 with air being diagrammatically illustrated as flowing past the circular bicycle rim during riding.

Also, the inner annular portion 26 has a plurality of spoke attachment openings 38 for receiving the spokes 16. The annular tire engagement portion 28 is provided with a plurality of spoke access openings 40 for accessing the spokes 16. Thus, the number of the spoke access openings 40 corresponds to the number of the spoke attachment openings 38 which corresponds to the number of the spokes 16. The inner annular portion 26 and the annular tire engagement portion 28 also a tire fill valve opening (not shown). The rim body of the rim 12 has an overall uniform cross sectional profile about its entire circumference that forms a circular loop around the center rotational axis A. In particular, the term "overall uniform cross sectional profile" as used herein refers to the cross sectional outline of a single section of the rim 12 as seen in FIG. 5. Thus, whether the cross section of the rim 12 includes the spoke attachment openings 38 or not, the cross sectional outline of the rim body remains unchanged. Moreover, the first and second outer peripheral edges 30 and 32 are not part of the cross sectional outline of the rim body, since the rim body refers to the portions of the rim 12 that are located radially inward of the annular tire engagement portion 28 with respect to the center rotational axis A.

Figure 6:
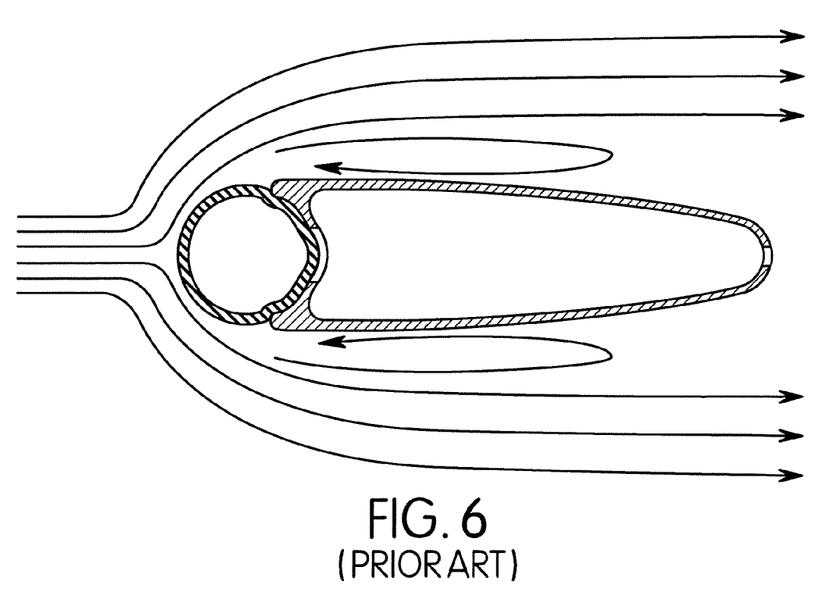
FIG. 6 is a cross-sectional view of a prior art bicycle rim and tire with air being diagrammatically illustrated as flowing past the bicycle rim during riding.

As best seen in FIG. 3, each of the first and second outer peripheral edges 30 and 32 has uneven edge surfaces with respect to a radial direction of the bicycle rim 12. In this embodiment, the uneven edge surfaces are defined by a plurality of depressions 42 with respect to an outermost periphery on the first and second outer peripheral edges 30 and 32. Thus, the depressions 42 with respect to the outermost periphery on the first and second outer peripheral edges 30 and 32 constitutes a turbulent boundary layer inducement structure that causes turbulent air flow as the bicycle rim rotates about the center rotational axis A. In other words, the depressions 42 with respect to the outermost periphery on the first and second outer peripheral edges 30 and 32 create a turbulent boundary layer when the wheel 10 travels through air to reduce aerodynamic drag. This is similar to the use of dimples on a golf ball. Preferably, the depressions 42 are arranged in a cyclic or periodic pattern around the first and second outer peripheral edges 30 and 32. The distance between adjacent ones of the depressions 42 is preferably set to a predetermined pitch. As seen in FIGS. 5 and 6, the depressions 42 in the outermost periphery on the first and second outer peripheral edges 30 and 32 create a turbulent boundary layer when the wheel 10 travels through air to reduce aerodynamic drag as compared to an identically shaped wheel without the first and second outer peripheral edges 30 and 32.

In this embodiment, the depressions 42 of the first and second outer peripheral edges 30 and 32 are arranged such that the first and second outer peripheral edges 30 and 32 are undulating between spoke attachment points (i.e., the openings 38) of the rim body. The depressions 42 are all identical and have concave surface curvatures. The depressions 42 are equally spaced apart about the first and second outer peripheral edges 30 and 32 at even intervals as seen in FIG. 4. The depressions 42 have equal circumferential length or dimension as seen in FIG. 4. While the first and second outer peripheral edges 30 and 32 are integrally formed with the rim body in the first illustrated embodiment (FIGS. 1 to 5), the depressions 42 could be added to the rim body as separate members. In the illustrated embodiment, each of the depressions 42 has a prescribed circumferential length or dimension in a range of 1 millimeter to 10 millimeters, and a prescribed radial depth or dimension in a range of 1 millimeter to 5 millimeters. Generally, the depressions 42 of the first and second outer peripheral edges 30 and 32 form rough and/or coarse outer surfaces that have abrupt directional changes with respect to the radial direction of the bicycle rim 12. In other words, the outer surfaces of the first and second outer peripheral edges 30 and 32 are non-smooth surfaces that include pits, indentations and/or dimple formed by the depressions 42.

Figure 7:
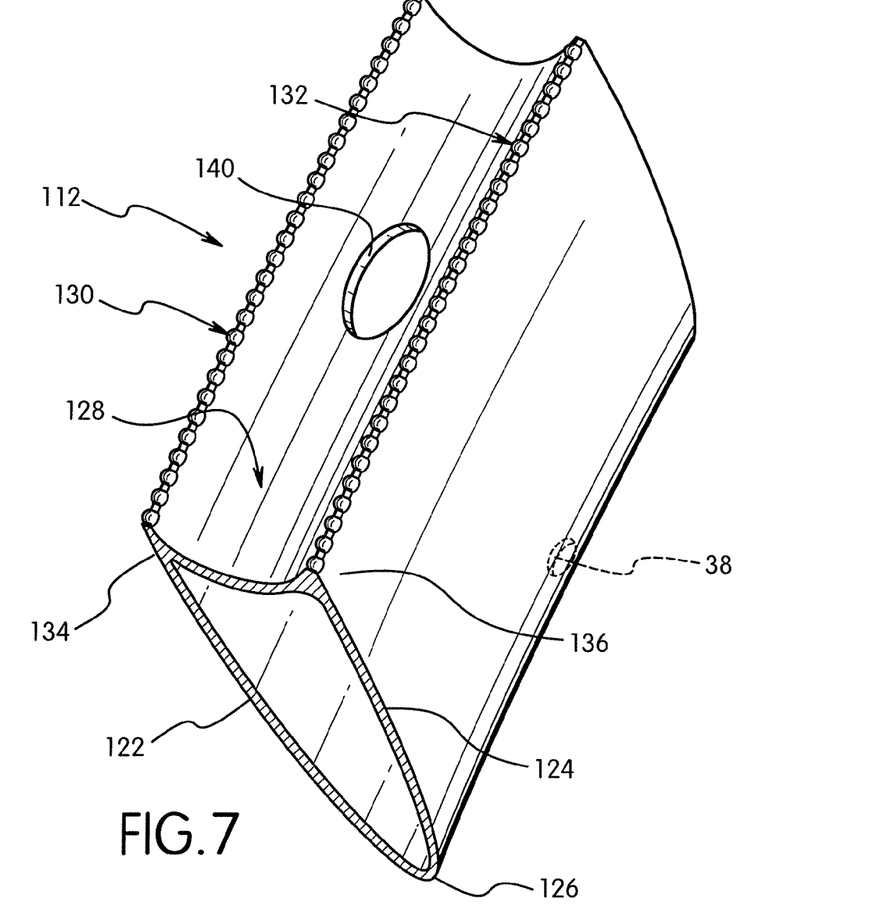
FIG. 7 is an enlarged, partial perspective view of a circular bicycle rim in accordance with a second embodiment.
Figure 8:
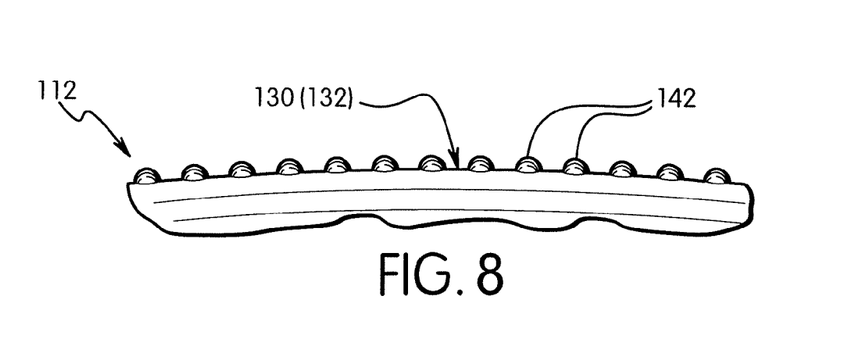
FIG. 8 is a further enlarged, partial side elevational view of one of the outer peripheral edges of the circular bicycle rim illustrated FIG. 7.

Referring now to FIGS. 7 and 8, a portion of a circular bicycle rim 112 is illustrated in accordance with a second embodiment. The rim 112 is attached to the hub 14 by the spokes 16 in the same manner as the rim 12 as seen in FIG. 1. The rim 112 basically includes first and second annular side wall portions 122 and 124 that are connected at their inner ends to form an inner annular portion 126. The outer ends of the first and second annular side wall portions 122 and 124 are connected together by an annular tire engagement portion 128. The only difference between the rims 12 and 112 is that the depressions 42 of rim 12 have been replaced with a plurality of projections 142 on the first and second outer peripheral edges 130 and 132. In view of the similarity between the first and second embodiments, the descriptions of the parts of the second embodiment that are identical to the parts of the first embodiment have been omitted for the sake of brevity.

In this second embodiment, the first and second annular side wall portions 122 and 124 are also provided with first and second brake engagement surfaces 134 and 136, respectively, that are adjacent the first and second outer peripheral edges 130 and 132. Also, the inner annular portion 126 has a plurality of spoke attachment openings 138 for receiving the spokes 16. The annular tire engagement portion 128 is provided with a plurality of spoke access openings 140 for accessing the spokes 16. In this embodiment, the annular tire engagement portion 128 has a sew-up or tubular tire engagement surface.

As best seen in FIG. 8, in this second embodiment, the projections 142 of the first and second outer peripheral edges 130 and 132 are arranged such that the first and second outer peripheral edges 130 and 132 are undulating between spoke attachment points (i.e., the openings 138) of the rim body. Preferably, the projections 142 are arranged in a cyclic or periodic pattern around the first and second outer peripheral edges 130 and 132. The distance between adjacent ones of the projections 142 is preferably set to a predetermined pitch. The projections 142 are equally spaced apart about the first and second outer peripheral edges 130 and 132 at even intervals as seen in FIG. 8. The projections 142 have equal circumferential length or dimension as seen in FIG. 8. In the second illustrated embodiment (FIGS. 7 and 8), the projections 142 are separate member that are bonded to the added the first and second outer peripheral edges 130 and 132. The projections 142 can be made of the same material as the rest of the rim 12 or different material from the rest of the rim 12. Thus, in the second illustrated embodiment, the first and second outer peripheral edges 130 and 132 are formed of a different material than the rim body. In the illustrated embodiment, each of the projections 142 has a prescribed circumferential length or dimension in a range of 1 millimeter to 10 millimeters, and a prescribed radial height or dimension in a range of 1 millimeter to 5 millimeters. Generally, the projections 142 of the first and second outer peripheral edges 130 and 132 form rough and/or coarse outer surfaces that have abrupt directional changes with respect to the radial direction of the bicycle rim 112. In other words, the outer surfaces of the first and second outer peripheral edges 130 and 132 are non-smooth surfaces that are bumpy and/or jagged due to the projections 142.

Figure 9:
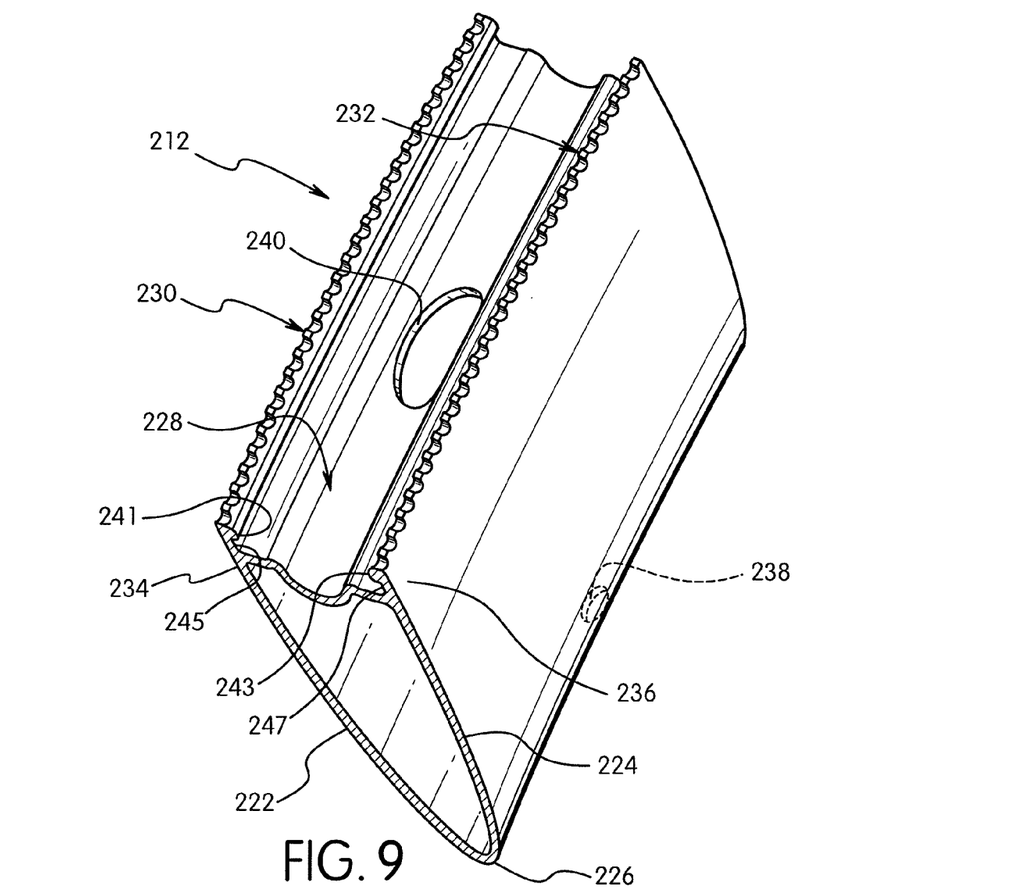
FIG. 9 is an enlarged, partial perspective view of a circular bicycle rim in accordance with a third embodiment.
Figure 10:
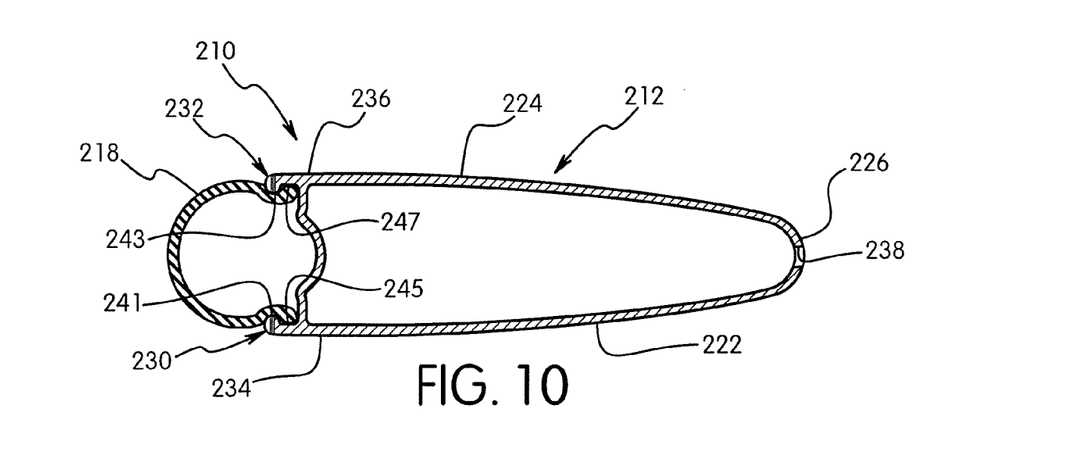
FIG. 10 is a cross-sectional view of the circular bicycle rim and tire illustrated in FIG. 9 in accordance with the third embodiment.

Referring now to FIGS. 9 and 10, a portion of a circular bicycle rim 212 is illustrated in accordance with a third embodiment. The rim 212 is attached to the hub 14 by the spokes 16 in the same manner as the rim 12 as seen in FIG. 1. The rim 212 basically includes first and second annular side wall portions 222. and 224 that are connected at their inner ends to form an inner annular portion 226. The outer ends of the first and second annular side wall portions 222 and 224 are connected together by an annular tire engagement portion 228. The first and second annular side wall portions 222 and 224 are provided with first and second brake engagement surfaces 234 and 236. The only difference between the rims 12 and 212 is that annular tire engagement portion 228 has a clincher tire engagement surface that has first and second opposed retaining ridges 241 and 243 on the first and second outer peripheral edges 230 and 232, respectively, that partially define first and second tire bead receiving grooves 245 and 247. In view of the similarity between the first and third embodiments, the descriptions of the parts of the third embodiment that are identical to the parts of the first embodiment have been omitted for the sake of brevity.

In this third embodiment, the uneven edge surfaces of the first and second outer peripheral edges 230 and 232 are defined by a plurality of depressions 242 with respect to an outermost periphery of the first and second outer peripheral edges 230 and 232. In the case of using a tubeless tire, the depressions 242 are located radially outward of the first and second tire bead receiving grooves 245 and 247.

Figure 11:
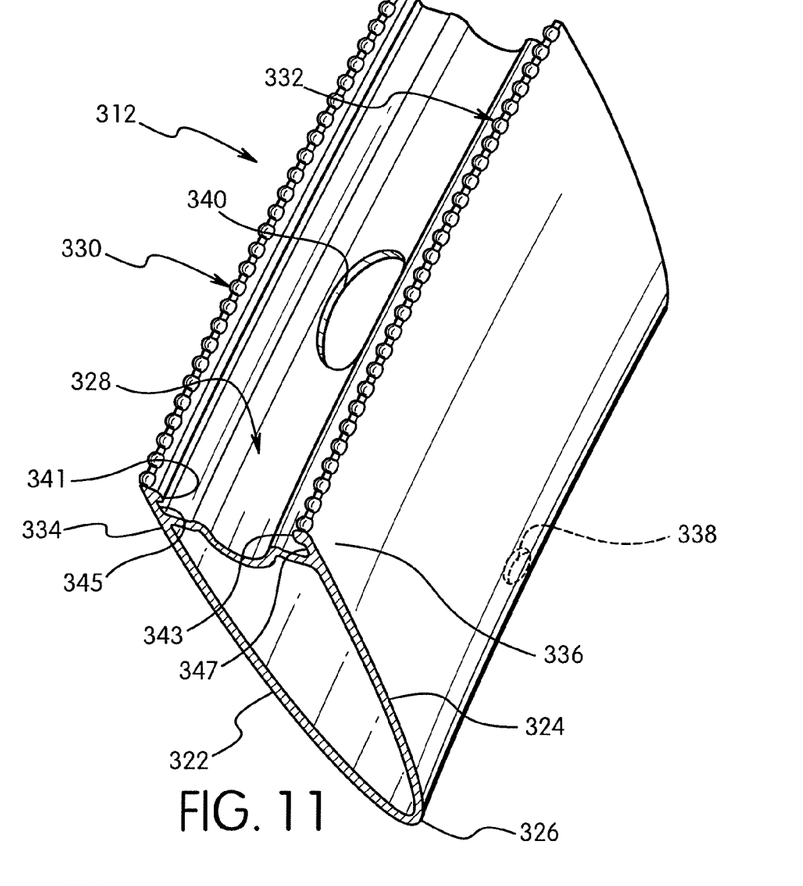
FIG. 11 is an enlarged, partial perspective view of a circular bicycle rim in accordance with a fourth embodiment.
Figure 12:
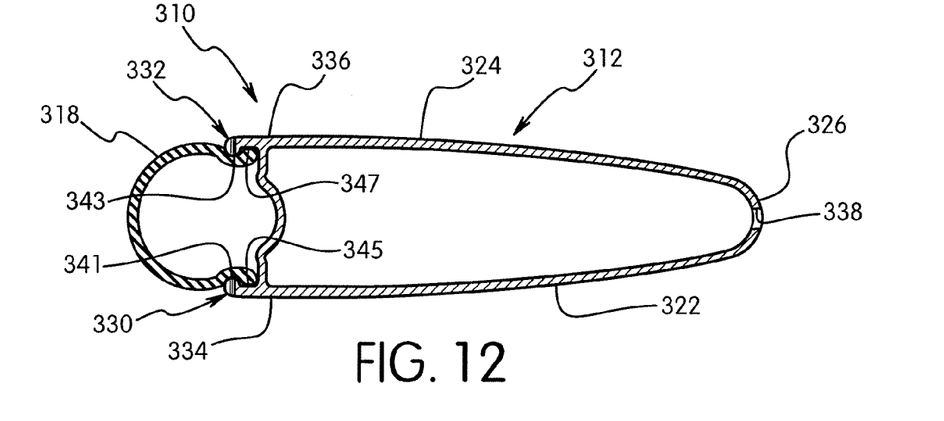
FIG. 12 is a cross-sectional view of the circular bicycle rim and tire illustrated in FIG. 11 in accordance with the fourth embodiment.

Referring now to FIGS. 11 and 12, a portion of a circular bicycle rim 312 is illustrated in accordance with a fourth embodiment. The rim 312 is attached to the hub 14 by the spokes 16 in the same manner as the rim 12 as seen in FIG. 1.

The rim 312 basically includes first and second annular side wall portions 322 and 324 that are connected at their inner ends to form an inner annular portion 326. The outer ends of the first and second annular side wall portions 322 and 324 are connected together by an annular tire engagement portion 328. The rim 312 is similar to the rim 112. The only difference between the rims 112 and 312 is that annular tire engagement portion 328 has a clincher tire engagement surface that has first and second opposed retaining ridges 341 and 343 on the first and second outer peripheral edges 330 and 332, respectively, that partially define first and second tire bead receiving grooves 345 and 347. In view of the similarity between the second and fourth embodiments, the descriptions of the parts of the fourth embodiment that are identical to the parts of the second embodiment have been omitted for the sake of brevity.

In this fourth embodiment, the uneven edge surfaces of the first and second outer peripheral edges 330 and 332 are defined by a plurality of projections 342 with respect to an outermost periphery of the first and second outer peripheral edges 330 and 332. The projections 342 are identical to the projections 142 discussed above.

Figure 13:
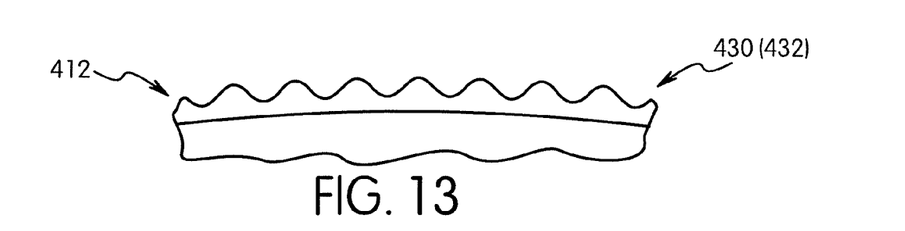
FIG. 13 is an enlarged, partial side elevational view of one of the outer peripheral edges of a circular bicycle rim in accordance with a fifth embodiment.

Referring now to FIG. 13, a portion of a circular bicycle rim 412 is illustrated in accordance with a fifth embodiment. The rim 412 is attached to the hub 14 by the spokes 16 in the same manner as the rim 12 as seen in FIG. 1. The rim 412 has the same configuration as either the rim 12 or the rim 212, except for its first and second outer peripheral edges 430 and 432. In other words, the rim 412 can be either a sew-up or tubular tire rim as in FIGS. 1 to 5 (i.e., the rim 12) or a clincher tire rim as in FIGS. 9 and 10 (i.e., the rim 212).

The only difference between the rim 412 and the rims 12 and 212 is first and second outer peripheral edges 430 and 432. In view of the similarity between this embodiment and the prior embodiments, the descriptions of the parts of this embodiment that are identical to the parts of the prior embodiments have been omitted for the sake of brevity. In this embodiment, the first and second outer peripheral edges 430 and 432 are separate elements that are fixedly attached to at least one of the rim body and the annular tire engagement portion. For example, the first and second outer peripheral edges 430 and 432 can be tape members that are adhesively bonded at the interface between the rim body and the annular tire engagement portion. Alternatively, the first and second outer peripheral edges 430 and 432 can be integrally formed with the rest of the rim 412 as a one-piece, unitary member. In any event, the shape of the first and second outer peripheral edges 430 and 432 form uneven edge surfaces that constitutes a turbulent boundary layer inducement structure that causes turbulent air flow as the bicycle rim 412 rotates about the center rotational axis A.

Figure 14:
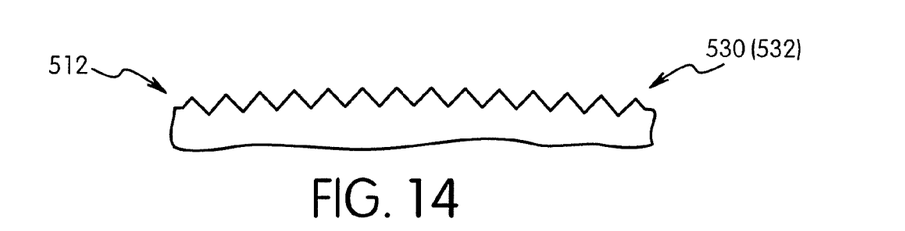
FIG. 14 is an enlarged, partial side elevational view of one of the outer peripheral edges of a circular bicycle rim in accordance with a sixth embodiment.

Referring now to FIG. 14, a portion of a circular bicycle rim 512 is illustrated in accordance with a sixth embodiment. The rim 512 is attached to the hub 14 by the spokes 16 in the same manner as the rim 12 as seen in FIG. 1. The rim 512 has the same configuration as either the rim 12 or the rim 212, except for its first and second outer peripheral edges 530 and 532. In other words, the rim 512 can be either a sew-up or tubular tire rim as in FIGS. 1 to 5 (i.e., the rim 12) or a clincher tire rim as in FIGS. 9 and 10 (i.e., the rim 212).

The only difference between the rim 512 and the rims 12 and 212 is first and second outer peripheral edges 530 and 532. In view of the similarity between this embodiment and the prior embodiments, the descriptions of the parts of this embodiment that are identical to the parts of the prior embodiments have been omitted for the sake of brevity. In this embodiment, the first and second outer peripheral edges 530 and 532 can be either separate elements that are fixedly attached to at least one of the rim body and the annular tire engagement portion as in the rim 412 of FIG. 13, or integrally formed with the rest of the rim 512 as a one-piece, unitary member as in the rim 12 of FIGS. 1 to 5. In any event, the shape of the first and second outer peripheral edges 530 and 532 form uneven edge surfaces that constitutes a turbulent boundary layer inducement structure that causes turbulent air flow as the bicycle rim 512 rotates about the center rotational axis A.

Figure 15:
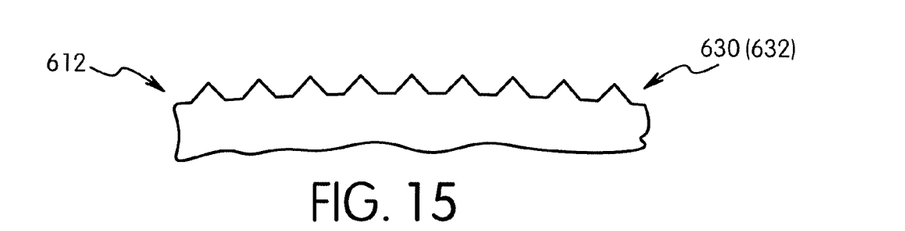
FIG. 15 is an enlarged, partial side elevational view of one of the outer peripheral edges of a circular bicycle rim in accordance with a seventh embodiment.

Referring now to FIG. 15, a portion of a circular bicycle rim 612 is illustrated in accordance with a seventh embodiment. The rim 612 is attached to the hub 14 by the spokes 16 in the same manner as the rim 12 as seen in FIG. 1. The rim 612 has the same configuration as either the rim 12 or the rim 212, except for its first and second outer peripheral edges 630 and 632. In other words, the rim 612 can be either a sew-up or tubular tire rim as in FIGS. 1 to 5 (i.e., the rim 12) or a clincher tire rim as in FIGS. 9 and 10 (i.e., the rim 212).

The only difference between the rim 612 and the rims 12 and 212 is first and second outer peripheral edges 630 and 632. In view of the similarity between this embodiment and the prior embodiments, the descriptions of the parts of this embodiment that are identical to the parts of the prior embodiments have been omitted for the sake of brevity. In this embodiment, the first and second outer peripheral edges 630 and 632 can be either separate elements that are fixedly attached to at least one of the rim body and the annular tire engagement portion as in the rim 412 of FIG. 13, or integrally formed with the rest of the rim 612 as a one-piece, unitary member as in the rim 12 of FIGS. 1 to 5. In any event, the shape of the first and second outer peripheral edges 630 and 632 form uneven edge surfaces that constitutes a turbulent boundary layer inducement structure that causes turbulent air flow as the bicycle rim 612 rotates about the center rotational axis A.

Figure 16:
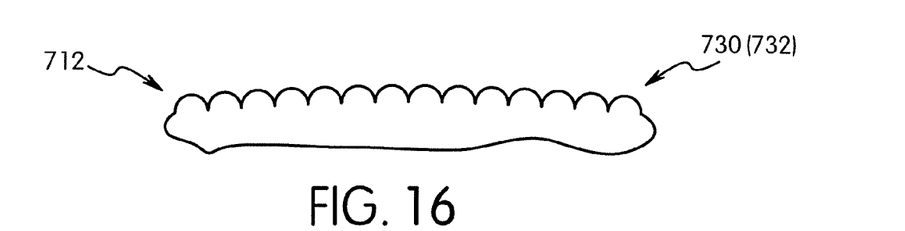
FIG. 16 is an enlarged, partial side elevational view of one of the outer peripheral edges of a circular bicycle rim in accordance with an eighth embodiment.

Referring now to FIG. 16, a portion of a circular bicycle rim 712 is illustrated in accordance with an eighth embodiment. The rim 712 is attached to the hub 14 by the spokes 16 in the same manner as the rim 12 as seen in FIG. 1. The rim 712 has the same configuration as either the rim 12 or the rim 212, except for its first and second outer peripheral edges 730 and 732. In other words, the rim 712 can be either a sew-up or tubular tire rim as in FIGS. 1 to 5 (i.e., the rim 12) or a clincher tire rim as in FIGS. 9 and 10 (i.e., the rim 212).

The only difference between the rim 712 and the rims 12 and 212 is first and second outer peripheral edges 730 and 732. In view of the similarity between this embodiment and the prior embodiments, the descriptions of the parts of this embodiment that are identical to the parts of the prior embodiments have been omitted for the sake of brevity. In this embodiment, the first and second outer peripheral edges 730 and 732 can be either separate elements that are fixedly attached to at least one of the rim body and the annular tire engagement portion as in the rim 412 of FIG. 13, or integrally formed with the rest of the rim 712 as a one-piece, unitary member as in the rim 12 of FIGS. 1 to 5. In any event, the shape of the first and second outer peripheral edges 730 and 732 form uneven edge surfaces that constitutes a turbulent boundary layer inducement structure that causes turbulent air flow as the bicycle rim 712 rotates about the center rotational axis A.

Figure 17:
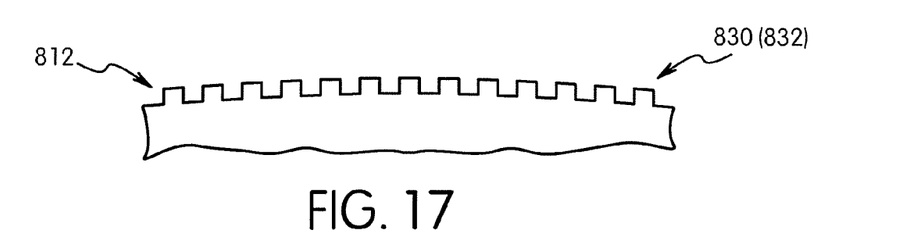
FIG. 17 is an enlarged, partial side elevational view of one of the outer peripheral edges of a circular bicycle rim in accordance with a ninth embodiment.

Referring now to FIG. 17, a portion of a circular bicycle rim 812 is illustrated in accordance with a ninth embodiment. The rim 812 is attached to the hub 14 by the spokes 16 in the same manner as the rim 12 as seen in FIG. 1. The rim 812 has the same configuration as either the rim 12 or the rim 212, except for its first and second outer peripheral edges 830 and 832. In other words, the rim 812 can be either a sew-up or tubular tire rim as in FIGS. 1 to 5 (i.e., the rim 12) or a clincher tire rim as in FIGS. 9 and 10 (i.e., the rim 212).

The only difference between the rim 812 and the rims 12 and 212 is first and second outer peripheral edges 830 and 832. In view of the similarity between this embodiment and the prior embodiments, the descriptions of the parts of this embodiment that are identical to the parts of the prior embodiments have been omitted for the sake of brevity. In this embodiment, the first and second outer peripheral edges 830 and 832 can be either separate elements that are fixedly attached to at least one of the rim body and the annular tire engagement portion as in the rim 412 of FIG. 13, or integrally formed with the rest of the rim 812 as a one-piece, unitary member as in the rim 12 of FIGS. 1 to 5. In any event, the shape of the first and second outer peripheral edges 830 and 832 form uneven edge surfaces that constitutes a turbulent boundary layer inducement structure that causes turbulent air flow as the bicycle rim 812 rotates about the center rotational axis A.

Figure 18:
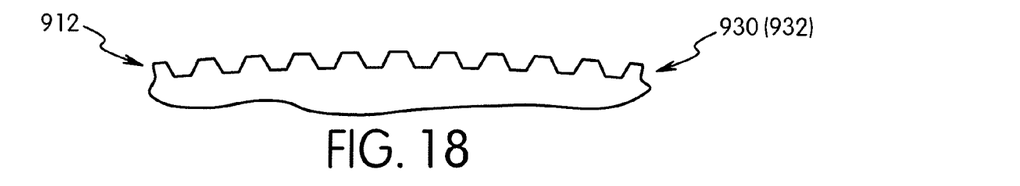
FIG. 18 is an enlarged, partial side elevational view of one of the outer peripheral edges of a circular bicycle rim in accordance with a tenth embodiment.

Referring now to FIG. 18, a portion of a circular bicycle rim 912 is illustrated in accordance with a tenth embodiment. The rim 912 is attached to the hub 14 by the spokes 16 in the same manner as the rim 12 as seen in FIG. 1. The rim 912 has the same configuration as either the rim 12 or the rim 212, except for its first and second outer peripheral edges 930 and 932. In other words, the rim 912 can be either a sew-up or tubular tire rim as in FIGS. 1 to 5 (i.e., the rim 12) or a clincher tire rim as in FIGS. 9 and 10 (i.e., the rim 212).

The only difference between the rim 912 and the rims 12 and 212 is first and second outer peripheral edges 930 and 932. In view of the similarity between this embodiment and the prior embodiments, the descriptions of the parts of this embodiment that are identical to the parts of the prior embodiments have been omitted for the sake of brevity. In this embodiment, the first and second outer peripheral edges 930 and 932 can be either separate elements that are fixedly attached to at least one of the rim body and the annular tire engagement portion as in the rim 412 of FIG. 13, or integrally formed with the rest of the rim 912 as a one-piece, unitary member as in the rim 12 of FIGS. 1 to 5. In any event, the shape of the first and second outer peripheral edges 930 and 932 form uneven edge surfaces that constitutes a turbulent boundary layer inducement structure that causes turbulent air flow as the bicycle rim 912 rotates about the center rotational axis A.

Figure 19:
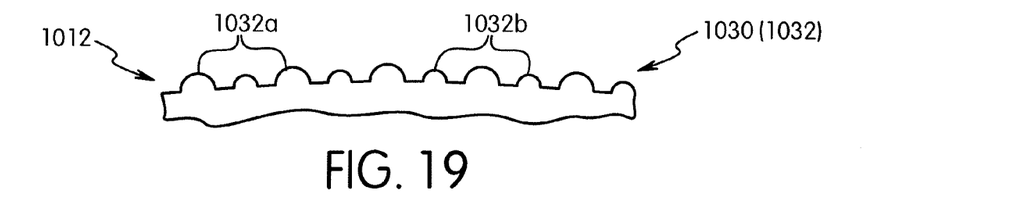
FIG. 19 is an enlarged, partial side elevational view of one of the outer peripheral edges of a circular bicycle rim in accordance with an eleventh embodiment.

Referring now to FIG. 19, a portion of a circular bicycle rim 1012 is illustrated in accordance with an eleventh embodiment. The rim 1012 is attached to the hub 14 by the spokes 16 in the same manner as the rim 12 as seen in FIG. 1. The rim 1012 has the same configuration as either the rim 12 or the rim 212, except for its first and second outer peripheral edges 1030 and 1032. In other words, the rim 1012 can be either a sew-up or tubular tire rim as in FIGS. 1 to 5 (i.e., the rim 12) or a clincher tire rim as in FIGS. 9 and 10 (i.e., the rim 212).

The only difference between the rim 1012 and the rims 12 and 212 is first and second outer peripheral edges 1030 and 1032. In view of the similarity between this embodiment and the prior embodiments, the descriptions of the parts of this embodiment that are identical to the parts of the prior embodiments have been omitted for the sake of brevity. In this embodiment, the first and second outer peripheral edges 1030 and 1032 can be either separate elements that are fixedly attached to at least one of the rim body and the annular tire engagement portion as in the rim 412 of FIG. 13, or integrally formed with the rest of the rim 1012 as a one-piece, unitary member as in the rim 12 of FIGS. 1 to 5. In this embodiment, the first and second outer peripheral edges 1030 and 1032 having a plurality of projections 1042a and 1042b with different radial heights (alternating large and small projections). In any event, the shape of the first and second outer peripheral edges 1030 and 1032 form uneven edge surfaces that constitutes a turbulent boundary layer inducement structure that causes turbulent air flow as the bicycle rim 1012 rotates about the center rotational axis A.

Figure 20:
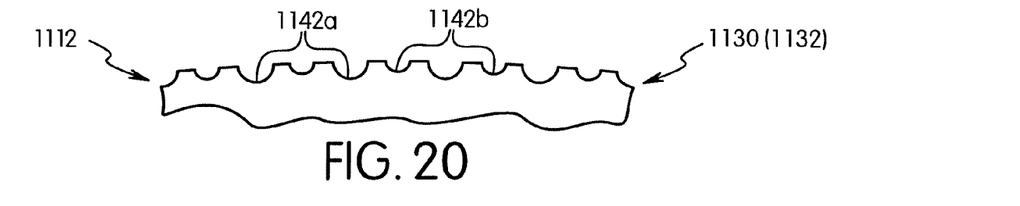
FIG. 20 is an enlarged, partial side elevational view of one of the outer peripheral edges of a circular bicycle rim in accordance with a twelfth embodiment.

Referring now to FIG. 20, a portion of a circular bicycle rim 1112 is illustrated in accordance with a twelfth embodiment. The rim 1112 is attached to the hub 14 by the spokes 16 in the same manner as the rim 12 as seen in FIG. 1. The rim 1112 has the same configuration as either the rim 12 or the rim 212, except for its first and second outer peripheral edges 1130 and 1132. In other words, the rim 1112 can be either a sew-up or tubular tire rim as in FIGS. 1 to 5 (i.e., the rim 12) or a clincher tire rim as in FIGS. 9 and 10 (i.e., the rim 212).

The only difference between the rim 1112 and the rims 12 and 212 is first and second outer peripheral edges 1130 and 1132. In view of the similarity between this embodiment and the prior embodiments, the descriptions of the parts of this embodiment that are identical to the parts of the prior embodiments have been omitted for the sake of brevity. In this embodiment, the first and second outer peripheral edges 1130 and 1132 can be either separate elements that are fixedly attached to at least one of the rim body and the annular tire engagement portion as in the rim 412 of FIG. 13, or integrally formed with the rest of the rim 1112 as a one-piece, unitary member as in the rim 12 of FIGS. 1 to 5. In this embodiment, the first and second outer peripheral edges 1130 and 1132 having a plurality of depressions 1142a and 1142b with different radial heights (alternating large and small depressions). In any event, the shape of the first and second outer peripheral edges 1130 and 1132 form uneven edge surfaces that constitutes a turbulent boundary layer inducement structure that causes turbulent air flow as the bicycle rim 1112 rotates about the center rotational axis A.

Figure 21:
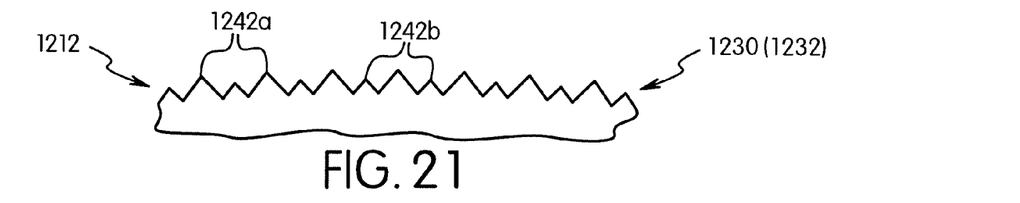
FIG. 21 is an enlarged, partial side elevational view of one of the outer peripheral edges of a circular bicycle rim in accordance with a thirteenth embodiment.

Referring now to FIG. 21, a portion of a circular bicycle rim 1212 is illustrated in accordance with a thirteenth embodiment. The rim 1212 is attached to the hub 14 by the spokes 16 in the same manner as the rim 12 as seen in FIG. 1. The rim 1212 has the same configuration as either the rim 12 or the rim 212, except for its first and second outer peripheral edges 1230 and 1232. In other words, the rim 1212 can be either a sew-up or tubular tire rim as in FIGS. 1 to 5 (i.e., the rim 12) or a clincher tire rim as in FIGS. 9 and 10 (i.e., the rim 212).

The only difference between the rim 1212 and the rims 12 and 212 is first and second outer peripheral edges 1230 and 1232. In view of the similarity between this embodiment and the prior embodiments, the descriptions of the parts of this embodiment that are identical to the parts of the prior embodiments have been omitted for the sake of brevity. In this embodiment, the first and second outer peripheral edges 1230 and 1232 can be either separate elements that are fixedly attached to at least one of the rim body and the annular tire engagement portion as in the rim 412 of FIG. 13, or integrally formed with the rest of the rim 1212 as a one-piece, unitary member as in the rim 12 of FIGS. 1 to 5. In this embodiment, the first and second outer peripheral edges 1030 and 1032 having a plurality of projections 1242a and 1242b with different radial heights (alternating large and small projections). In any event, the shape of the first and second outer peripheral edges 1230 and 1232 form uneven edge surfaces that constitutes a turbulent boundary layer inducement structure that causes turbulent air flow as the bicycle rim 1212 rotates about the center rotational axis A.

Figure 22:
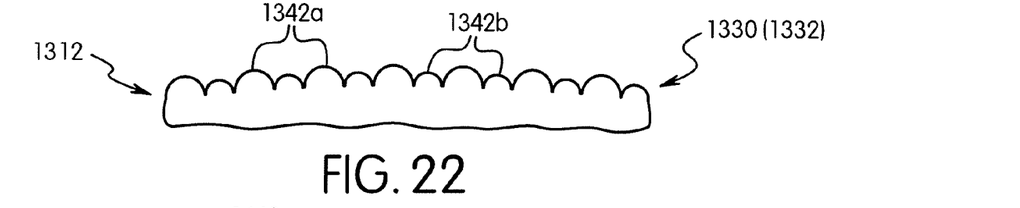
FIG. 22 is an enlarged, partial side elevational view of one of the outer peripheral edges of a circular bicycle rim in accordance with a fourteenth embodiment.

Referring now to FIG. 22, a portion of a circular bicycle rim 1312 is illustrated in accordance with a fourteenth embodiment. The rim 1312 is attached to the hub 14 by the spokes 16 in the same manner as the rim 12 as seen in FIG. 1. The rim 1312 has the same configuration as either the rim 12 or the rim 212, except for its first and second outer peripheral edges 1330 and 1332. In other words, the rim 1312 can be either a sew-up or tubular tire rim as in FIGS. 1 to 5 (i.e., the rim 12) or a clincher tire rim as in FIGS. 9 and 10 (i.e., the rim 212).

The only difference between the rim 1312 and the rims 12 and 212 is first and second outer peripheral edges 1330 and 1332. In view of the similarity between this embodiment and the prior embodiments, the descriptions of the parts of this embodiment that are identical to the parts of the prior embodiments have been omitted for the sake of brevity. In this embodiment, the first and second outer peripheral edges 1330 and 1332 can be either separate elements that are fixedly attached to at least one of the rim body and the annular tire engagement portion as in the rim 412 of FIG. 13, or integrally formed with the rest of the rim 1312 as a one-piece, unitary member as in the rim 12 of FIGS. 1 to 5. In this embodiment, the first and second outer peripheral edges 1330 and 1332 having a plurality of projections 1342a and 1342b with different radial heights (alternating large and small projections). In any event, the shape of the first and second outer peripheral edges 1330 and 1332 form uneven edge surfaces that constitutes a turbulent boundary layer inducement structure that causes turbulent air flow as the bicycle rim 1312 rotates about the center rotational axis A.

Figure 23:
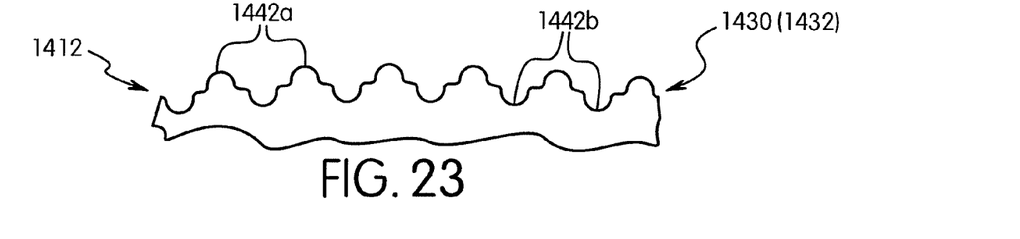
FIG. 23 is an enlarged, partial side elevational view of one of the outer peripheral edges of a circular bicycle rim in accordance with a fifteen embodiment.

Referring now to FIG. 23, a portion of a circular bicycle rim 1412 is illustrated in accordance with a fifteen embodiment. The rim 1412 is attached to the hub 14 by the spokes 16 in the same manner as the rim 12 as seen in FIG. 1. The rim 1412 has the same configuration as either the rim 12 or the rim 212, except for its first and second outer peripheral edges 1430 and 1432. In other words, the rim 1412 can be either a sew-up or tubular tire rim as in FIGS. 1 to 5 (i.e., the rim 12) or a clincher tire rim as in FIGS. 9 and 10 (i.e., the rim 212).

The only difference between the rim 1412 and the rims 12 and 212 is first and second outer peripheral edges 1430 and 1432. In view of the similarity between this embodiment and the prior embodiments, the descriptions of the parts of this embodiment that are identical to the parts of the prior embodiments have been omitted for the sake of brevity. In this embodiment, the first and second outer peripheral edges 1430 and 1432 can be either separate elements that are fixedly attached to at least one of the rim body and the annular tire engagement portion as in the rim 412 of FIG. 13, or integrally formed with the rest of the rim 1412 as a one-piece, unitary member as in the rim 12 of FIGS. 1 to 5. In this embodiment, the first and second outer peripheral edges 1430 and 1432 having a plurality of projections 1442a and a plurality of depressions 1442b that alternate around the rim. In any event, the shape of the first and second outer peripheral edges 1430 and 1432 form uneven edge surfaces that constitutes a turbulent boundary layer inducement structure that causes turbulent air flow as the bicycle rim 1412 rotates about the center rotational axis A.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "circular" as used herein to describe the illustrated bicycle rims does not require a perfect circle, but rather only requires the bicycle rim have a shape that is substantially a circle such that the bicycle rim can be used in its intend manner without substantially modifying its overall shape. Accordingly, these terms, as utilized to describe the bicycle rim should be interpreted relative to a bicycle equipped with the bicycle rim as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A circular bicycle rim comprising:
   a rim body including a. first annular side wall portion and a second annular side wall portion;
   an annular tire engagement portion extending between the first and second annular side wall portions to engage a tire thereon; and
   first and second outer peripheral edges located radially outward of the rim body with respect to a center rotational axis of the bicycle rim, each of the first and second outer peripheral edges having an uneven edge surface that repeatedly rises and falls with respect to a radial direction of the bicycle rim, the uneven edge surface of the first outer peripheral edge being located at an outermost periphery of the first outer peripheral edge with respect to the radial direction of the bicycle rim, and the uneven edge surface of the second outer peripheral edge being located at an outermost periphery of the second outer peripheral edge with res sect to the radial direction of the bicycle rim.

2. The circular bicycle rim according to claim 1, wherein the rim body has an overall uniform cross sectional profile that forms a circular loop around the center rotational axis.

3. The circular bicycle rim according to claim 1, wherein the uneven edge surfaces are arranged such that the first and second outer peripheral edges are undulating between spoke attachment points of the rim body.

4. The circular bicycle rim according to claim 1, wherein the uneven edge surfaces are defined by a plurality of depressions.

5. The circular bicycle rim according to claim 4, wherein the depressions are equally spaced apart about the first and second outer peripheral edges at even intervals.

6. The circular bicycle rim according to claim 4, wherein the depressions are all identical.

7. The circular bicycle rim according to claim 4, wherein the depressions have concave surface curvatures.

8. The circular bicycle rim according to claim 1 wherein the uneven edge surfaces are defined by a plurality of projections.

9. The circular bicycle rim according to claim 8, wherein the projections are equally spaced apart about the first and second outer peripheral edges at even intervals.

10. The circular bicycle rim according to claim 1, wherein the first and second outer peripheral edges are formed of a different material than the rim body.

11. The circular bicycle rim according to claim 1, wherein the first and second outer peripheral edges are separate elements that are fixedly attached to at least one of the rim body and the annular tire engagement portion.

12. The circular bicycle rim according to claim 1, wherein the first and second outer peripheral edges are integrally formed with the rim body and the annular tire engagement portion as a one-piece, unitary member.

13. The circular bicycle rim according to claim 1, wherein the annular tire engagement portion has a tubular tire engagement surface.

14. The circular bicycle rim according to claim 13, wherein the uneven edge surfaces are defined by a plurality of depressions.

15. The circular bicycle rim according to claim 13, wherein the uneven edge surfaces are defined by a plurality of projections.

16. The circular bicycle rim according to claim 1, wherein the first and second annular side wall portions are connected to form an annular interior space.

17. A circular bicycle rim comprising:
a rim body including a first annular side wall portion and a second annular side wall portion;
an annular tire engagement portion extending between the first and second annular side wall portions to engage a tire thereon; and
first and second outer peripheral edges located radially outward of the rim body with respect to a center rotational axis of the bicycle rim, each of the first and second outer peripheral edges having an uneven edge surface that repeatedly rises and falls with respect to a radial direction of the bicycle rim,
the annular tire engagement portion having a clincher tire engagement surface with first and second opposed retaining ridges on the first and second outer peripheral edges, respectively, that partially define first and second tire bead receiving grooves.

18. The circular bicycle rim according to claim 17, wherein the uneven edge surfaces are defined by a plurality of depressions, with the depressions being located radially outward of the first and second tire bead receiving grooves.

19. The circular bicycle rim according to claim 17, wherein the uneven edge surfaces are defined by a plurality of projections with the projections being located radially outward of the first and second tire bead receiving grooves.

20. A bicycle wheel comprising:
a hub having a center rotational axis;
a connecting structure connected to the hub; and
a circular bicycle rim connected to the connecting structure, the circular bicycle rim including
a rim body including a first annular side wall portion and a second annular side wall portion,
an annular tire engagement portion extending between the first and second annular side wall portions to engage a tire thereon, and
first and second outer peripheral edges located radially outward of the rim body with respect to the center rotational axis, each of the first and second outer peripheral edges having an uneven edge surface that repeatedly rises and falls with respect to a radial direction of the bicycle rim, the uneven edge surface of the first outer peripheral edge being located at an outermost periphery of the first outer peripheral edge with respect to the radial direction of the bicycle rim, and the uneven edge surface of the second outer peripheral edge being located at an outermost periphery of the second outer peripheral edge with respect to the radial direction of the bicycle rim.

\* \* \* \* \*